US012531367B2

(12) United States Patent
Wang et al.

(10) Patent No.: US 12,531,367 B2
(45) Date of Patent: Jan. 20, 2026

(54) CABLE CONNECTOR FOR CONNECTING A CABLE HAVING A CENTRAL CONDUCTOR

(71) Applicants: TE Connectivity India Private Limited, Bangalore (IN); Tyco Electronics (Shanghai) Co., Ltd., Shanghai (CN)

(72) Inventors: Yunhe (Bill) Wang, Shanghai (CN); Wenke He, Shanghai (CN); Peng Zhai, Shanghai (CN); Usha Kiran Govindaraj, Bangalore (IN); G Praveen Kumar, Bangalore (IN)

(73) Assignees: TE Connectivity India Private Limited, Bangalore (IN); Tyco Electronics (Shanghai) Co., Ltd., Shanghai (CN)

( * ) Notice: Subject to any disclaimer, the term of this patent is extended or adjusted under 35 U.S.C. 154(b) by 315 days.

(21) Appl. No.: 18/353,130

(22) Filed: Jul. 17, 2023

(65) Prior Publication Data

US 2024/0022020 A1 Jan. 18, 2024

(30) Foreign Application Priority Data

Jul. 15, 2022 (CN) ......................... 202210839914.1

(51) Int. Cl.

| | |
|---|---|
| ***H01R 13/622*** | (2006.01) |
| ***H01R 13/424*** | (2006.01) |
| ***H01R 13/639*** | (2006.01) |
| ***H01R 13/6581*** | (2011.01) |

(52) U.S. Cl.
CPC ......... *H01R 13/622* (2013.01); *H01R 13/424* (2013.01); *H01R 13/639* (2013.01); *H01R 13/6581* (2013.01)

(58) Field of Classification Search
CPC .. H01R 13/622; H01R 13/424; H01R 13/639; H01R 13/6581
See application file for complete search history.

(56) References Cited

U.S. PATENT DOCUMENTS 3,517,371 A * 6/1970 Buckley ............... H01R 13/622 285/85
3,671,926 A * 6/1972 Zdenek Nepovim .... H01R 9/05 439/584

(Continued)

*Primary Examiner* — Thanh Tam T Le
(74) *Attorney, Agent, or Firm* — Barley Snyder

(57) ABSTRACT

A cable connector includes an outer shell, an outer electrical conductor mounted within the outer shell and defining a first through hole, an insulating housing disposed inside the outer electrical conductor and defining a second through hole, an inner electrical conductor disposed inside the insulating housing and defining an insertion cavity and a connection hole communicating with the insertion cavity, a fastener mounted at least partially in the connection hole and operable to fasten a center conductor of the cable inserted into the insertion cavity, and an insulating ring fitted over the outer circumferential surface of the electrical conductor. The insulating ring is movable between a shielding position in which the first through hole is covered and a non-shielding position in which the first through hole is uncovered to allow the fastener to be exposed from the first and second through holes aligned with each other.

20 Claims, 9 Drawing Sheets

(56) References Cited

U.S. PATENT DOCUMENTS

| | | | | | |
|---|---|---|---|---|---|
| 4,923,412 | A * | 5/1990 | Morris | H01R 9/0521 | 439/578 |
| 5,795,188 | A * | 8/1998 | Harwath | H01R 24/566 | 439/583 |
| 6,019,636 | A * | 2/2000 | Langham | H01R 9/0521 | 439/583 |
| 7,329,149 | B2 * | 2/2008 | Montena | H01R 9/0521 | 439/578 |
| 7,335,059 | B2 * | 2/2008 | Vaccaro | H01R 43/28 | 439/578 |
| 7,448,906 | B1 * | 11/2008 | Islam | H01R 9/05 | 439/578 |
| 7,699,665 | B1 * | 4/2010 | Yin | H01R 13/502 | 439/669 |
| 7,731,529 | B1 * | 6/2010 | Islam | H01R 24/564 | 439/583 |
| 7,785,144 | B1 * | 8/2010 | Islam | H01R 24/40 | 439/583 |
| 7,819,698 | B2 * | 10/2010 | Islam | H01R 24/40 | 439/607.45 |
| 7,914,342 | B2 * | 3/2011 | Chen | H01R 13/05 | 439/669 |
| 7,931,499 | B2 * | 4/2011 | Islam | H01R 13/6277 | 439/584 |
| 9,768,549 | B1 * | 9/2017 | Chen | H01R 4/38 | |
| 10,651,593 | B2 * | 5/2020 | Wu | H01R 13/6277 | |
| 10,658,794 | B2 * | 5/2020 | Zhang | H01R 24/40 | |
| 10,950,969 | B2 * | 3/2021 | Wu | H01R 13/514 | |
| 11,075,471 | B2 * | 7/2021 | Vaccaro | H01R 9/05 | |

* cited by examiner

CABLE CONNECTOR FOR CONNECTING A CABLE HAVING A CENTRAL CONDUCTOR

CROSS-REFERENCE TO RELATED APPLICATIONS

This application claims the benefit of the filing date under 35 U.S.C. § 119(a)-(d) of Chinese Patent Application No. 202210839914.1, filed on Jul. 15, 2022.

FIELD OF THE INVENTION

Embodiments of the present disclosure generally relate to a connector, and more specifically, to a cable connector.

BACKGROUND

In the design of existing cable connectors, there are many shortcomings, such as a large number of components, a relatively complex assembling process, a large size, and a high cost. In an application scenario where on-site assembling process is required, for example a high-altitude working environment such as an outdoor high-voltage cable connecting operation, the disadvantages of having many components and relatively complex assembly processes bring significant inconvenience to the assembling of the cable connectors.

During the assembling process of the cable connector, after using a fastener such as a screw to tighten and fix an inner conductive body in a cable assembly to a central conductor of the cable connector, it is necessary to prevent the screw from coming into contact with a metal outer shell of the cable connector (especially if the screw is loosened), so that the electrical isolation between the central conductor and the metal outer shell is achieved. In addition, it is also necessary to prevent damage to an inner conductive body in the cable assembly during the tightening process of screws. Furthermore, in the structures of the conventional connectors, the fixing or disassembling operation of the inner conductive body of the cables within the connectors may be complex or even unsafe.

Moreover, during the assembling process of the cable connectors, a braided component in the cable assembly often directly covers a screw hole or moves to cover the screw hole after assembling, which causes the braided wire or debris of the braided component to enter the screw hole and contact the screw that is used to fasten the electrical connection between the inner conductive body and the central conductor, thereby resulting in a short circuit.

SUMMARY

A cable connector includes an outer shell, an outer electrical conductor mounted within the outer shell and defining a first through hole, an insulating housing disposed inside the outer electrical conductor and defining a second through hole, an inner electrical conductor disposed inside the insulating housing and defining an insertion cavity and a connection hole communicating with the insertion cavity, a fastener mounted at least partially in the connection hole and operable to fasten a center conductor of the cable inserted into the insertion cavity, and an insulating ring fitted over the outer circumferential surface of the electrical conductor. The insulating ring is movable between a shielding position in which the first through hole is covered and a non-shielding position in which the first through hole is uncovered to allow the fastener to be exposed from the first and second through holes aligned with each other.

BRIEF DESCRIPTION OF THE DRAWINGS

The invention will be described in more detail in the following with reference to exemplary embodiments illustrated in the drawings, in which.

DETAILED DESCRIPTION OF THE EMBODIMENTS

Figure 1:
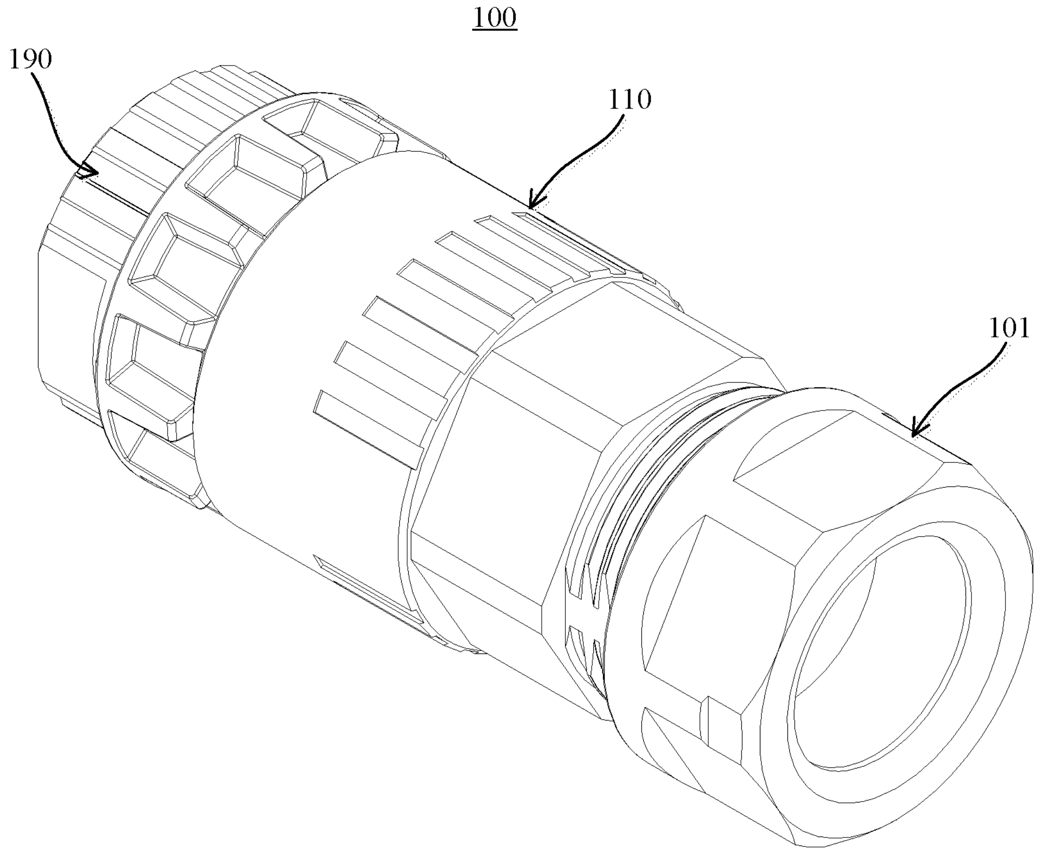
FIG. 1 is a perspective view of a cable connector in an assembled state according to an exemplary embodiment of the present disclosure.

The following is a further detailed explanation of the disclosed technical solution with embodiments and in conjunction with the accompanying drawings. In the following description, the same or similar reference numerals indicate the same or similar components. The following explanation of the disclosed embodiments with reference to the accompanying drawings is intended to explain the overall inventive concept of the present disclosure and should not be understood as limiting the present disclosure.

In addition, in the detailed description below, many specific details have been elaborated to provide a comprehensive understanding of the disclosed embodiments for ease of explanation. However, it is evident that one or more embodiments can also be implemented without these specific details. In other cases, well-known structures and devices are illustrated to simplify the accompanying drawings.

A cable connector 100 according to the exemplary embodiments of the present disclosure is provided. The cable connector 100 is suitable for connecting various cables 200 such as electrical cables. The cable 200 comprises a central conductor 210, an outer braided layer 220, and other structures, such as an insulator wrapping around the central conductor and a sheath sheathed over the outer braided layer, etc.

In the embodiments shown in FIGS. 1-4, the cable connector 100 includes an outer shell 110, an external conductive body 120, an insulating housing 130, an inner conductive body 140, and an optional end cover 190 arranged sequentially from the outside to the inside. The outer shell 110 may be a cylindrical or hollow body that extends longitudinally or axially and may be made of a conductive material or insulating material, for example metal housing or plastic housing. The external conductive body 120, for example, includes a metal body or is made of other conductive materials, and is at least partially mounted within the outer shell 110 and defines a first accommodating cavity 122. The insulating housing 130 is arranged within the first accommodating cavity 122 of the external conductive body 120 and defines a second accommodating cavity 132. The inner conductive body 140, for example, includes a metal body or is made of other conductive materials, and is arranged within the second accommodating cavity 132 of the insulating housing 130. Therefore, the inner conductive body 140 is electrically isolated from the external conductive body 120 by the insulating housing 130. The end cover 190 may be detachably mounted on one end of the external conductive body 120.

Figure 2:
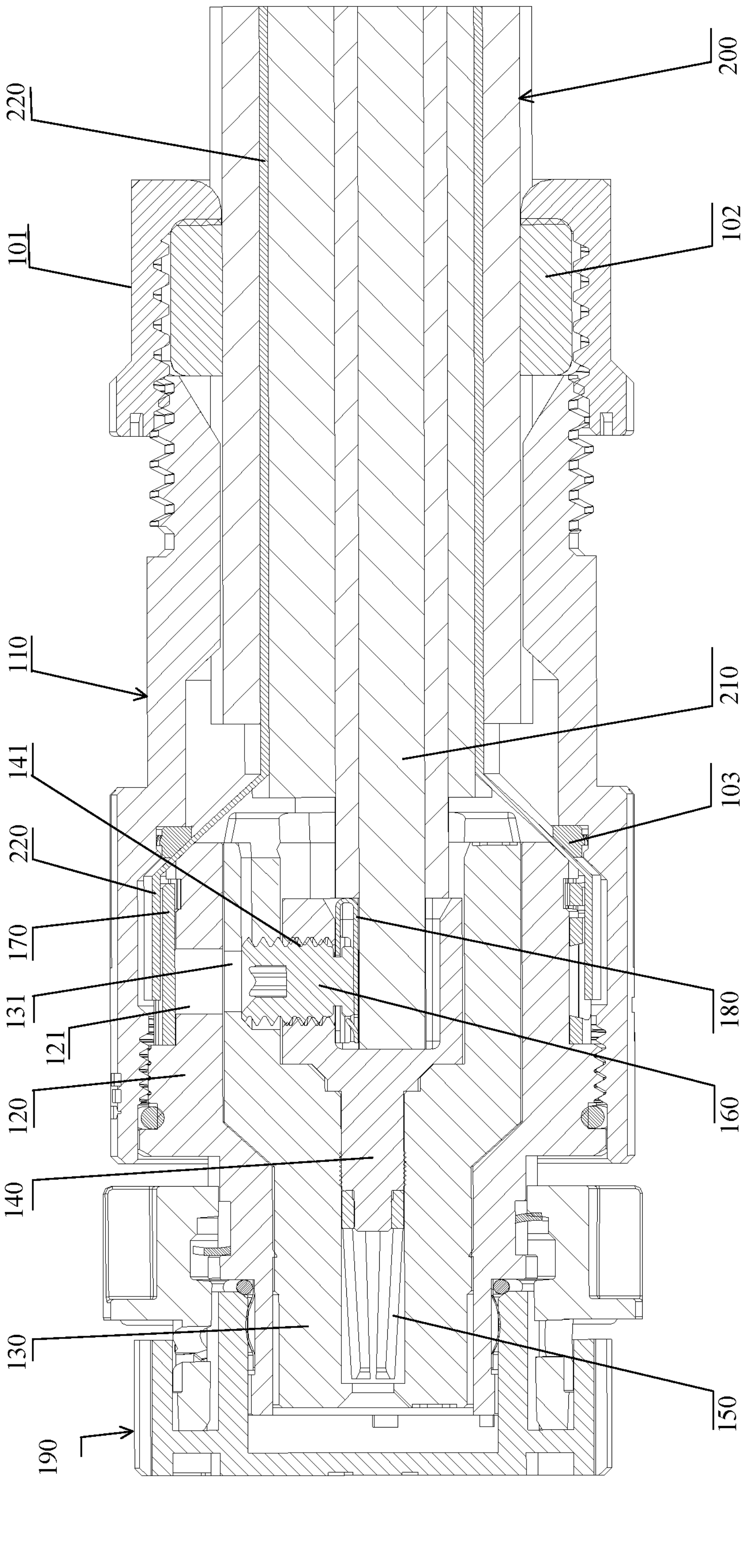
FIG. 2 is a sectional side view showing the structure of a cable connector according to an exemplary embodiment of the present disclosure, with a connected cable being shown.

As shown in FIG. 2, the inner conductive body 140 is used for electrically connecting the central conductor 210 of the inserted cable 200. The inner conductive body 140 may be equipped with or mounted with an inner contact terminal 150, which is used for electrically contacting a mating terminal on a mating connector or a circuit board. The inner conductive body 140 defines an insertion cavity 142 into which the central conductor 210 of the cable 200 can be inserted.

According to an embodiment of the present disclosure, the cable connector 100 further includes a fastener 160 for holding and tightening the central conductor 210, which is inserted into the cable 200, into the inner conductive body 140. Therefore, the cable 200 can be electrically connected to the mating connector or the circuit board by the central conductor 210, the inner conductive body 140 and the inner contact terminal 150. As an example, the fastener 160 may be the conductive component. The fastener 160 can be operated by a user (for example, with the help of an operating tool) to tighten the central conductor 210 of the cable 200 inside the inner conductive body 140 (for example, the fastener 160 firmly presses the central conductor 210 against the inner wall of the insertion cavity 142 of the inner conductive body 140 so that the central conductor 210 stably electric contacts the inner conductive body 140), or to loosen the fastening of the central conductor 210 to allow the removal of the central conductor 210 from the cable connector.

As shown in FIG. 2, after inserting and tightening the cable 200 into the cable connector 100, a locking member 101 may sleeve or fit over the cable 210 and the outer shell 110 to lock both of the cable 210 and the outer shell 110. A sealing ring 102 may be provided between the locking member 101 and the cable 210, and between the locking member 101 and the outer shell 110.

In the illustrated exemplary embodiments, referring to FIGS. 2-5, a first through hole 121 is formed in the wall of the external conductive body 120, and may extend radially through the wall of the external conductive body 120 to lead to the first accommodating cavity 122. A second through hole 131 is formed in the wall of the insulating housing 130 and may for example extend radially through the wall of the insulating housing 130 to lead to the second accommodating cavity 132. A connection hole 141 is formed in the wall of the inner conductive body 140 to be in communication with the insertion cavity 142, for example the connection hole 141 may extend radially through the wall of the inner conductive body 140 to lead to the insertion cavity 142. The fastener 160 can be at least partially mounted in the connection hole 141, and when being operated, can fasten the central conductor 210 of the cable 200, which is inserted into the insertion cavity 142, into the insertion cavity 142 or loosen the fastening of the central conductor 210.

According to an exemplary embodiment, after the cable connector 100 is assembled, the external conductive body 120, the insulating housing 130 and the inner conductive body 140 can be positioned so that the first through hole 121 and the second through hole 131 are aligned (for example, radially) with the connection hole 141, thereby allowing the fastener 160 mounted in the connection hole 141 to be operated from outside of the external conductive body 120 (for example, with the help of an operating tool) via the aligned first through hole 121 and the second through hole 131, so as to achieve tightening or loosening of the central conductor 210 inserted into the insertion cavity 142. As an example, the fastener 160 may include a screw or have screw threads, while the connection hole 141 of the inner conductive body 140 may be a threaded hole, thereby allowing the fastener 160 to be screwed into the connection hole 141. Turning the fastener 160 in the connection hole 141 can tighten the central conductor 210 into the insertion cavity 142 or loosen the fastening of the central conductor 210.

According to the exemplary embodiment in the present disclosure, the cable connector 100 is further equipped with an insulation ring 170, which can be sleeved on or fit over the outer circumferential surface of the external conductive body 120 and can cover the first through hole 121 from the outside.

According to the exemplary embodiment in the present disclosure, the insulating ring 170 can be moved between a shielding position, in which the insulating ring 170 covers the first through hole 121 and therefore covers the second through hole 131, and a non-shielding position, in which the first through hole 121 is not covered by the insulation ring 170 to allow a portion of the fastener 160 located in the connection hole 141 to be exposed from the aligned first through hole 121 and second through hole 131. This allows the user to operate the fastener 160 (for example, with the help of an operating tools, such as a screwdriver) through the exposed first through hole 121 and second through hole 131, so as to fasten the central conductor 210 into the insertion cavity 142 or loosen the fastening of the central conductor 210. Therefore, during the assembly process, the insulation ring 170 can be moved to the non-shielding position to achieve the operation of the fastener 160. After the assembly process, the insulation ring 170 can be moved to the shielding position to ensure that the connector is safe in operation. For example, the insulation ring 170 can rotate circumferentially or shift axially around the outer circumferential surface of the external conductive body 120 to be switched between the shielded and non-shielding positions.

When the cable 200 is connected to the cable connector 100, the central conductor 210 of the cable 200 is inserted into cable connector 100 or its inner conductive body 140, while the outer braided layer 220 of the cable 200 is usually placed over the external conductive body 120. At this time, there may be a risk of the outer braided layer 220 or its debris entering the aforementioned holes and coming into contact with the fastener 160, thereby leading to short circuit.

According to exemplary embodiments in the present disclosure, the insulation ring 170 of the cable connector 100 is sleeved or fitted over the outer circumferential surface of the external conductive body 120, while the outer braided layer 220 of the cable 200 inserted into the cable connector 100 is placed over the outer circumferential surface of the insulation ring 170. The insulation ring 170 can cover the outside of the first through hole 121, thereby the insulation ring 170 is used to prevent the outer braided layer 220 or its debris from entering the aforementioned hole (s) and coming into contact with the fastener 160. As shown in FIG. 2, the outer braided layer 220 can be positioned or clamped between the insulation ring 170 and the outer shell 110, and can electrically contact at least one of the external conductive body 120 and the outer shell 110 so as to provide electromagnetic shielding effect on the central conductor 210. As shown in the figures, a conductive ring 103 may be arranged between the outer braided layer 220 and the outer shell 110, and the outer shell 110 presses the outer braided layer 220 against the external conductive body 120 via the conductive ring 103.

According to the exemplary embodiments in the present disclosure, the insulation ring 170 can be moved between the shielding position and the non-shielding position. In the shielding position, the insulation ring 170 covers the first through hole 121 and therefore covers the second through hole 131 to electrically isolate the fastener 160 located in the connection hole 141 of the inner conductive body 140 from the outer braided layer 220 located outside the insulation ring 170, thereby avoiding the risk of short circuits in the assembled cable connector.

In exemplary embodiments, as shown in FIGS. 4 and 6-8, a third through hole 171 extending radially may be formed in the wall of the insulation ring 170. When the insulation ring 170 is moved to the shielding position, the third through hole 171 is misaligned or spaced apart from the first through hole 121, for example, is offset from the first through hole 121 in a circumferential direction or in an axial direction, thereby causing the insulation ring 170 (such as its body part) to cover the first through hole 121. When the insulation ring 170 is moved to the non-shielding position, the third through hole 171 is radially aligned to the first through hole 121, thereby allowing the fastener 160 located in the connection hole 141 of the inner conductive body 140 to be exposed from the first through hole 121, the second through hole 131 and third through hole 171 which are aligned to one another, thereby facilitating operation by the user.

For example, the dimensions of the first through hole 121, the second through hole 131 and the third through hole 171 are appropriately constructed to allow an operating tool to extend through the third through hole 171, the second through hole 131 and the first through hole 121, which are aligned to one another, from the outside of the insulation ring 170 to operate the fastener 160 positioned in the connection hole 141 of the inner conductive body 140, to fasten the central conductor 210 inserted into the cavity 142 of the inner conductive body 140 or loosen the fastening of the central conductor 210 by the fastener 160.

In some embodiments, the insulation ring 170 may be rotated circumferentially or slide axially on the outer circumferential surface of the external conductive body 120 to selectively be shifted to the shielding position or the non-shielding position. As shown in FIGS. 4 and 6-8, the insulation ring 170 may be provided with an indication sign, for example, to indicate a direction in which the insulation ring 170 is moved to the shielding position or the non-shielding position.

As an example, as shown in FIGS. 3-6, a guide groove 123 may be formed in the outer circumferential surface of the external conductive body 120, and a guide rib 173 may be formed on the inner wall surface of the insulation ring 170, or vice versa. The guide groove 123 and the guide rib 173 may extend circumferentially or axially, and the guide rib 173 can slide in the guide groove 123 to guide the movement of the insulation ring 170 between the shielding position and the non-shielding position. It can be understood that the number of the guide grooves 123 and the guide ribs 173 may be one or more.

In further embodiments, as shown in FIGS. 3-8, a locking groove 124 may be formed in the outer circumferential surface of the external conductive body 120, while a locking protrusion 174 may be formed on an inner wall surface of the insulation ring 170, or vice versa. The locking protrusion 174 can be embedded and locked into the locking groove 124 to fix the position of the insulation ring 170 relative to the external conductive body 120 when the insulation ring 170 is moved to the shielding position or the non-shielding position. It can be understood that the number of the locking groove and the locking protrusion may be one or more. Exemplarily, the insulation ring 170 may have a certain degree of elasticity, for example, may include a cylindrical body made of an elastic material, in order to lock and unlock the position of the insulation ring relative to the external conductive body.

In addition, referring to the embodiments shown in FIGS. 2-5 and 7-8, the outer circumferential surface of the external conductive body 120 may be formed with a step which includes adjacent step surfaces and a wall surface located between the step surfaces. The guide groove 123 is formed on one of the step surfaces 125 (e.g., a step surface closer to the central axis of the external conductive body in a radial direction), and the insulation ring 170 is axially positioned between the wall surface and the guide groove 123, thereby axially limiting the position of the insulation ring 170 and ensuring that the sliding or rotation of the insulation ring 170 on the outer circumferential surface of the external conductive body 120 can reliably cause the selective radial alignment of the third through hole 171 with the first through hole 121.

As shown in FIGS. 2-7, another step surface on the outer circumferential surface of the external conductive body 120 may be formed with threads 126 so that the external conductive body 120 can be mounted in the outer shell 110 in a threaded connection manner.

Figure 3:
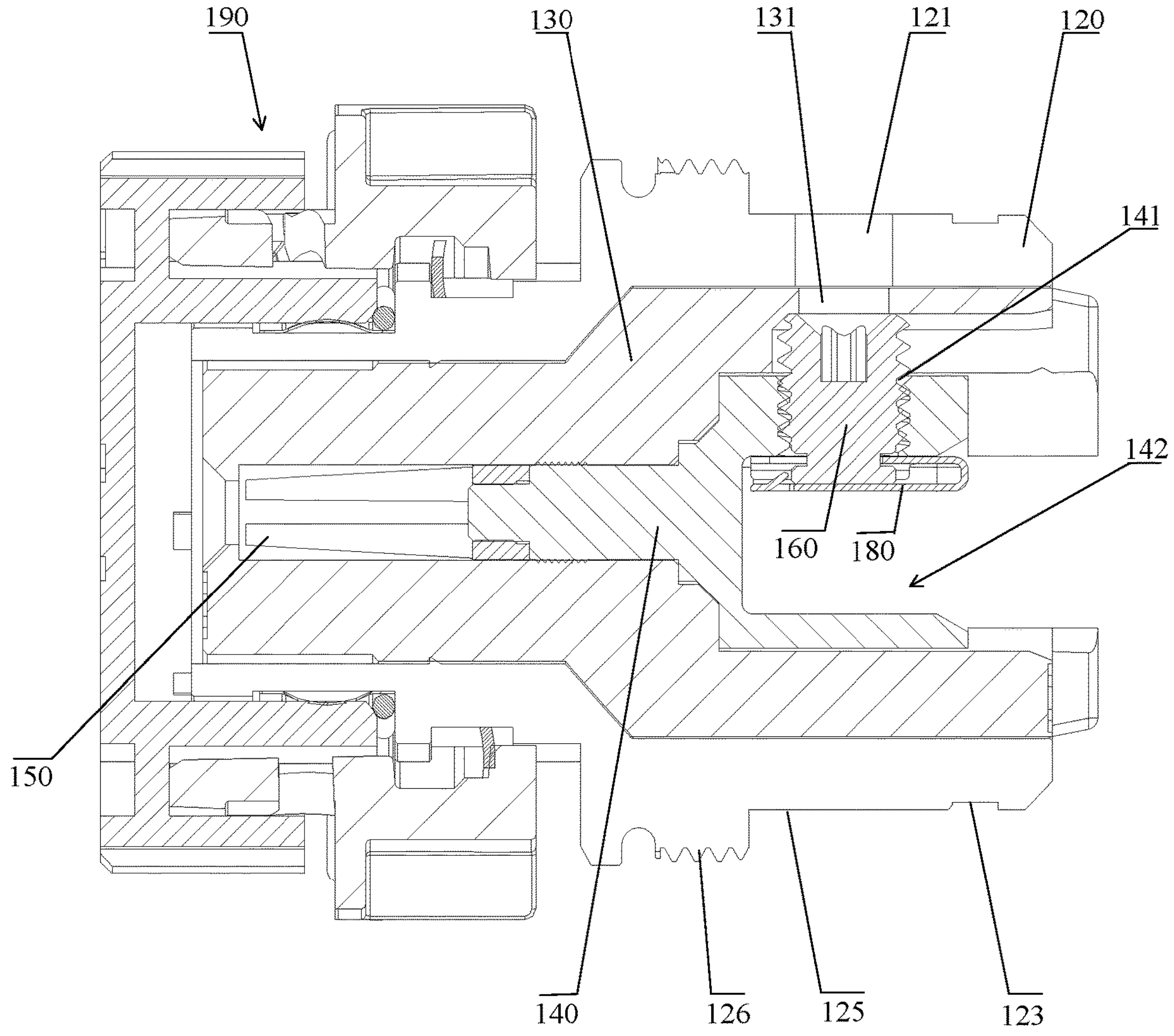
FIG. 3 is a sectional side view showing a local structure of a cable connector according to an exemplary embodiment of the present disclosure, with the cable being removed.
Figure 4:
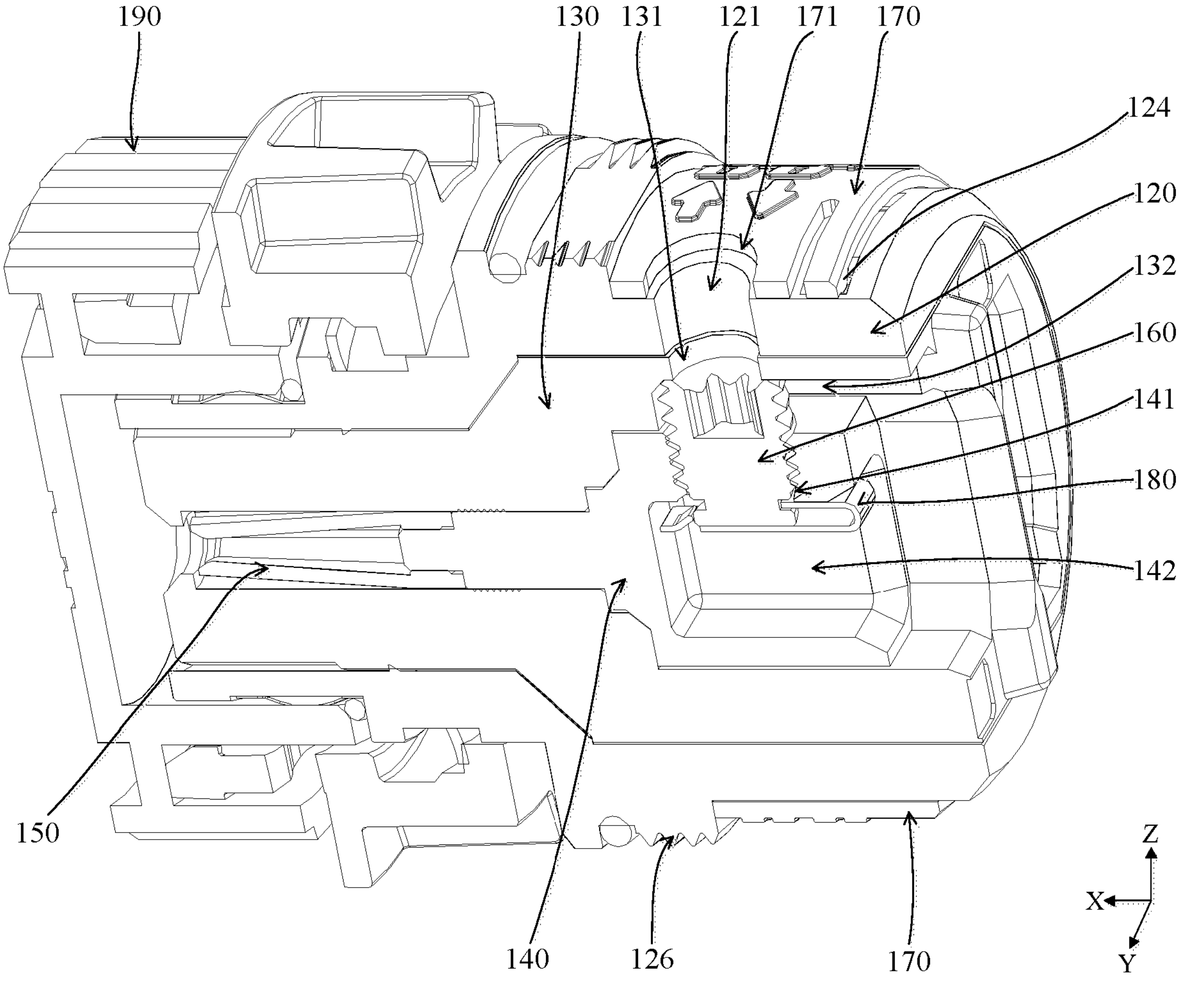
FIG. 4 is a sectional perspective view showing the structure of a cable connector according to an exemplary embodiment of the present disclosure.
Figure 5:
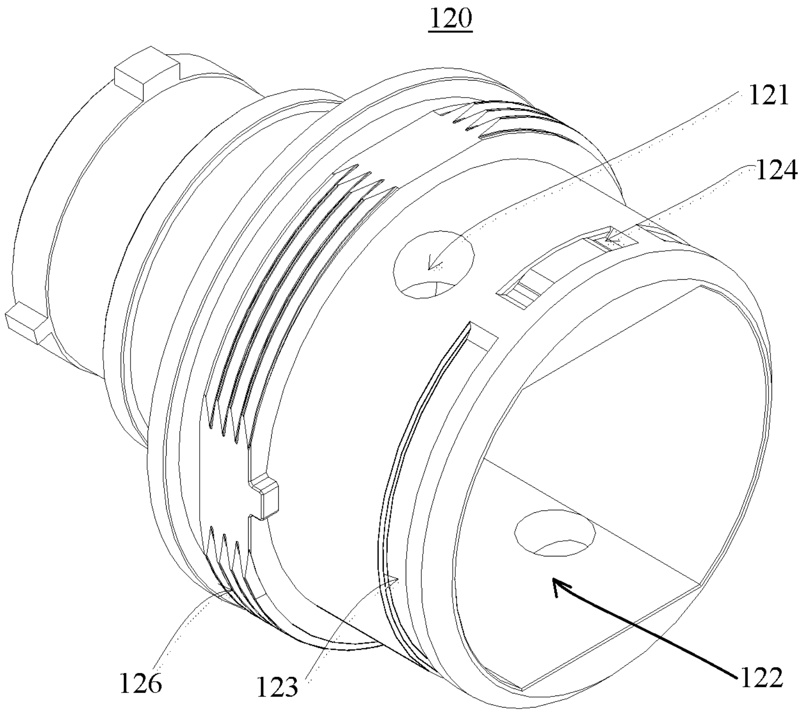
FIG. 5 is a perspective view showing the structure of an external conductor of a cable connector according to an exemplary embodiment of the present disclosure.
Figure 6:
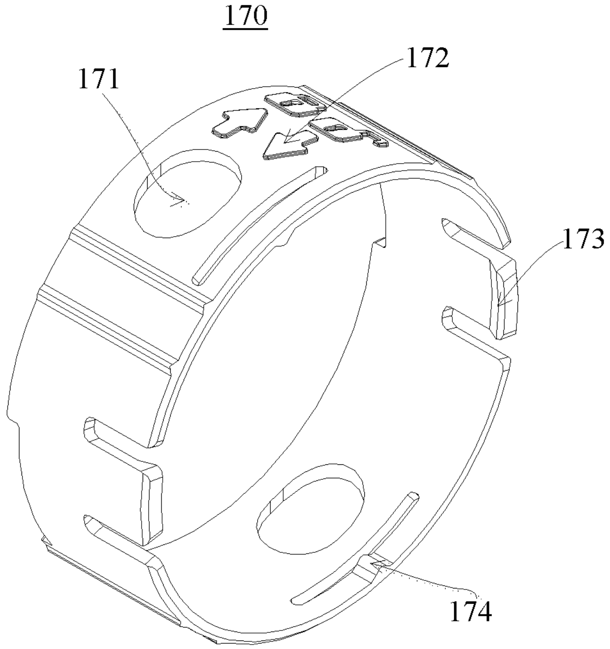
FIG. 6 is a perspective view showing the structure of an insulation ring of the cable connector according to an exemplary embodiment of the present disclosure.
Figure 7:
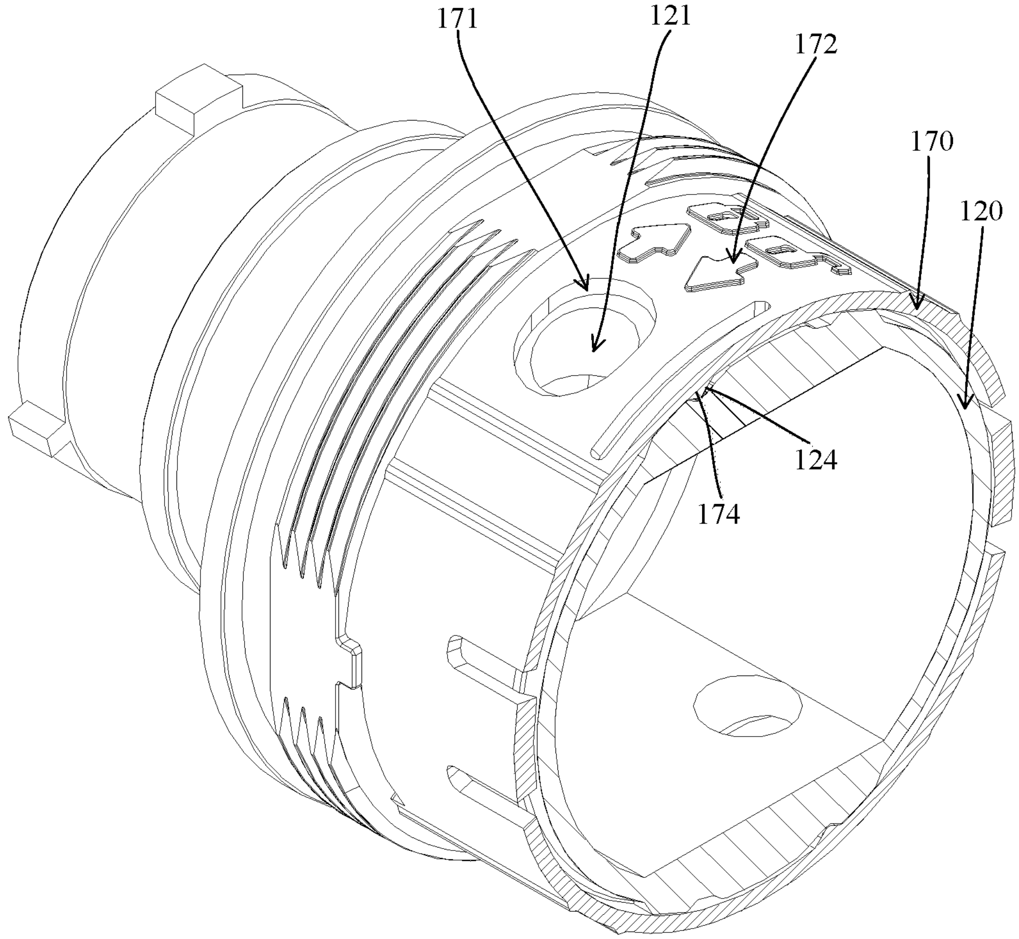
FIG. 7 is a perspective view showing an insulation ring and an external conductive body, which are assembled together, of a cable connector, according to an exemplary embodiment of the present disclosure, where the insulation ring is in a non-shielding position.

As shown in FIGS. 2-4, the fastener 160 is mounted in the connection hole 141 of the inner conductive body 140, with a first end positioned in the second receiving cavity 132 of the insulating housing 130 and an opposite second end positioned in the insertion cavity 142 of the inner conductive body 140. The first end is at least partially exposed from the second through hole 131, first through hole 121 and third through hole 171 which are aligned to one another, and the exposed first end of the fastener 160 can be operated by the user using the operating tool, thereby causing the second end of the fastener 160 to compress and fix the central conductor 210 inserted into the insertion cavity 142 of the inner conductive body 140, or to release the compression on the central conductor 210 by the second end to allow the removal of the central conductor 210.

In exemplary embodiments, as shown in FIGS. 2-4, the outer diameter of the first end of the fastener 160 may be greater than the inner diameter of the second through hole 131 of the insulating housing 130, so that the first end of the fastener 160 can be blocked by the inner wall of the second accommodating cavity 132 of the insulating housing 130. Therefore, regardless of whether the fastener 160 is mounted in place or not, it can be ensured that the fasteners 160 do not come into contact with the external conductive body or outer shell, thereby ensuring the safe use of the connector, and preventing accidental detachment or loss of the fastener 160. In other embodiments not shown, the fastener 160 may have a larger length and may extend through the second through hole 131 of the insulating housing 130 to partially enter the first through hole 121 of the external conductive body 120, thereby facilitating appropriate operation of the fastener 160 by the user.

In further embodiments according to the present disclosure, as shown in FIGS. 2-4 and 9, the cable connector 100 may further include a pressing spacer 180 positioned within the insertion cavity 142 of the inner conductive body 140, and the pressing spacer 180 has a pressing surface suitable for be pressed against the outer circumferential surface of the inserted central conductor 210. The pressing spacer 180 is suitable for being pushed by the fastener 160 to firmly press the inserted central conductor 210 onto the inner wall of the insertion cavity 142 by its pressing surface. Due to the presence of this pressing spacer 180, its pressing surface can be pressed against and matched with the outer circumferential surface of the inserted central conductor 210, which can prevent the fastener 160 from twisting or damaging the central conductor 210 when fixing the central conductor 210. The pressing surface of the pressing spacer 180 usually has an area larger than that of the end face of the fastener 160, thus when compared to conventional connectors, the pressing damage or fracture of the central conductor caused by the fastener 160 can be further avoided.

In the illustrated embodiment, the pressing spacer 180 may be mounted onto the second end of the fastener 160 so that when the fastener 160 is operated to move radially, and the pressing spacer 180 can move with the fastener 160 together to achieve the fastening or loosening of the central conductor 210 in the insertion cavity 142 of the inner conductive body 140.

As shown in FIGS. 2-4 and 9, the pressing spacer 180 may have a U-shaped contour, and include a first arm portion 181 and a second arm portion 182 which are opposite to each other. The first arm portion 181 is provided with an installation hole 183, and the pressing surface of the pressing spacer 180 may be defined by a flat or curved surface of the second arm portion 182 facing the inserted central conductor 210. The second end of the fastener 160 may be mounted in the installation hole 183, for example, the fastener 160 may enter the installation hole 183 from the open end of the U-shaped contour. The diameter of the second end of the fastener 160 may be greater than the inner diameter of the installation hole 183 to prevent the pressing spacer 180 from detaching from the fastener 160 in the radial direction (as shown in the Z direction in FIGS. 4 and 10). And the fastener 160 may have a narrowed part, which is located between the first end and the second end of the fastener 160 and has a diameter slightly smaller than the inner diameter of the installation hole 183, for example the narrowed part is close to the second end of the fastener 160, so as to be suitable for moving in the installation hole 183 to adjust the pushing position of the fastener on the pressing spacer. In addition, a stop portion 184 may also be formed on the inner wall surface of the second arm portion 182, and can prevent the pressing spacer 180 from detaching from the fastener 160 in the axial direction (as shown in the X direction in FIGS. 4 and 10) when the second end of the fastener 160 is pressed against the inner wall surface of the second arm portion 182.

Figure 10:
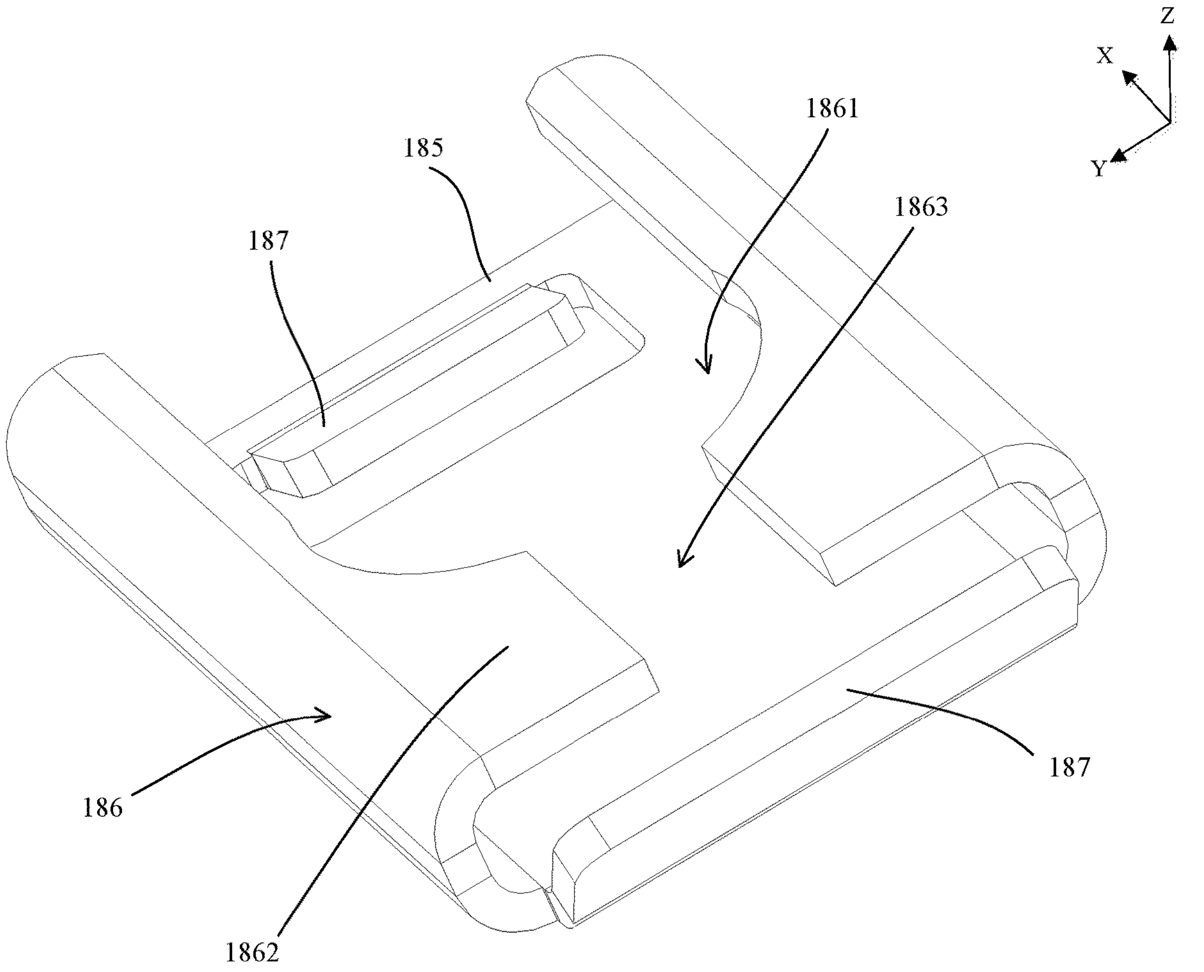
FIG. 10 is a perspective view showing the structure of a pressing spacer of a cable connector according to another exemplary embodiment of the present disclosure.

FIG. 10 illustrates the structure of a pressing spacer according to another embodiment of the present disclosure. As shown in the figure, the pressing spacer includes a bottom 185 and two limit portions 186 extending towards each other from the opposite sides of the bottom 185 (for example, the opposite sides in the Y direction in the figure). The surface of the bottom 185 facing the inserted central conductor 210 is served as the pressing surface, which may be a flat or curved surface. Two limit portions 186 are spaced apart from each other in the Y direction, for example, to define the installation hole 1861 therebetween. The second end of the fastener 160 is suitable for being mounted in the installation hole 1861, for example, being inserted into the installation hole 1861 from the open end of the pressing spacer, and being limited by two limit portions 186 to prevent the fastener 160 from radially detaching from the pressing spacer.

As shown in FIG. 10, each limit portion 186 may have a general C-shaped contour or cross-section, which comprises a first end connected to the bottom 185 and an opposite second end extending towards another limit portion, thereby defining a space between the two limit portions 186 for accommodating the second end of the fastener 160. In the illustrated example, the installation hole 1861 is defined between portions of the second ends of two limit portions 186 in the X direction, while a limiting hole 1863 is defined between another portions of the second ends of the two limit portions 186 in the X direction and has a smaller diameter, for example a diameter smaller than that of the installation hole 1861. For example, the another portion of the second end of each limit portion 186 in the X direction may be an extension portion 1862 extending towards the other limit portion. The distance between the extension portions 1862 of the two limit portions 186 is smaller than the outer diameter of the end of the fastener 160, and the limiting hole 1863 is defined by the two extension portions 1862. The diameter of the installation hole 1861 and/or the limiting hole 1863 may be slightly larger than the diameter of the narrowed part of the fastener 160, but smaller than the diameter of the second end of the fastener 160. Therefore, the fastener is movable in the installation hole 1861 and/or limiting hole 1863 so as to enable adjustment of the pushing position of the fastener on the pressing spacer.

Furthermore, a stop portion 187 may also be formed on the inner wall surface of the bottom wall 185. For example, stop portions 187 are respectively provided on opposite sides of the inner wall surface of the bottom wall 185 in the X direction (e.g., on the opposite sides of the installation hole 1861). When the second end of the fastener 160 is pressed against the inner wall surface of the bottom wall 185, the stop portions 187 can prevent the pressing spacer from detaching from the fastener 160 in the axial direction (for example the X direction in FIGS. 4 and 10) to some extent. In an exemplary embodiment, the above-mentioned pressing spacer may be integrally stamped and bent from a conductive (e.g., metal) sheet.

Figure 8:
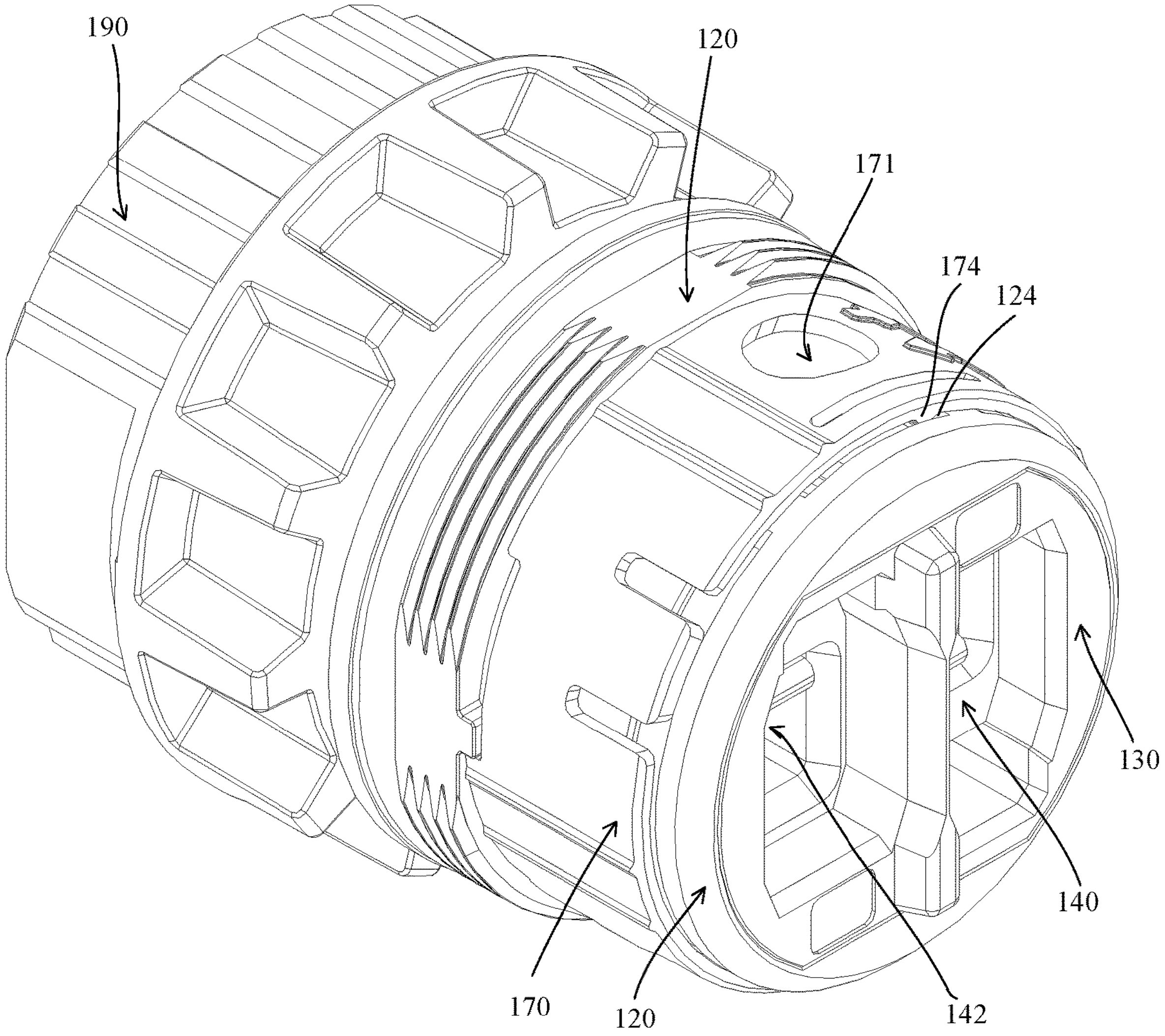
FIG. 8 is a perspective view showing a local structure of a cable connector according to an exemplary embodiment of the present disclosure, in which an outer shell is removed and the insulation ring is in a shielding position.
Figure 9:
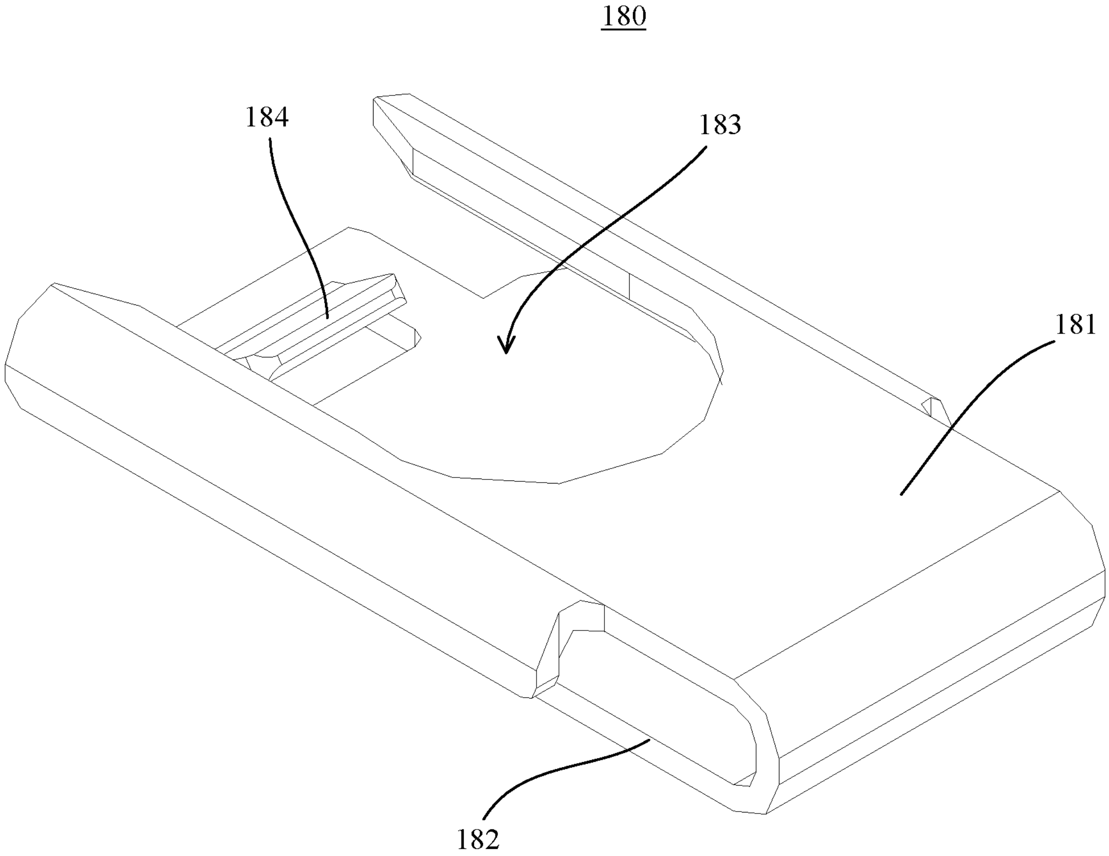
FIG. 9 is a perspective view showing the structure of a pressing spacer of a cable connector according to an exemplary embodiment of the present disclosure.

According to an exemplary embodiment of the present disclosure, the cable connector 100 may be a dual port connector with two insertion cavities (as shown in FIG. 8) or a three port connector with three insertion cavities, for different applications. The cable connectors according to various exemplary embodiments of the present disclosure have advantages over the existing technologies, including for example fewer components, a reliable structure, a lower cost, a simple assembling operation, a good compatibility, and safe use.

Those skilled in the art can understand that the embodiments described above are exemplary, and those skilled in the art can improve them. The structures described in various embodiments can be freely combined in the condition that there is no conflict in structure or principles.

Although the present disclosure has been explained in conjunction with the accompanying drawings, the embodiments disclosed in the drawings are intended to provide exemplary explanations of the preferred embodiments of the present disclosure and cannot be understood as limiting the present disclosure.

Although some embodiments of the present general inventive concept have been shown and explained, those skilled in the art will understand that changes can be made to these embodiments without departing from the principles and spirit of the present general inventive concept. The scope of this disclosure is limited by the claims and their equivalents.

It should be noted that the wording "including", "include", "have", "having", "comprise", "comprising" or the like does not exclude other components or steps, and the wording "a" or "one" does not exclude multiple. Furthermore, any component signs in the claims should not be construed as limiting the scope of this disclosure.

What is claimed is:

1. A cable connector for connecting a cable having a central conductor, comprising:

an outer shell having a cylindrical shape;

an external conductive body mounted at least partially within the outer shell and defining a first accommodating cavity, a first through hole is formed in a wall of the external conductive body;

an insulating housing provided in the first accommodating cavity and defining a second accommodating cavity, a second through hole is formed in a wall of the insulating housing;

an internal conductive body provided in the second accommodating cavity and defining an insertion cavity, the internal conductive body is electrically isolated from the external conductive body by the insulating housing, a connection hole is formed in a wall of the internal conductive body and communicates with the insertion cavity, the external conductive body, the insulating housing, and the internal conductive body are positioned so that the first through hole and the second through hole are aligned radially with the connection hole;

a fastener mounted at least partially in the connection hole and fastening the central conductor of the cable in the insertion cavity; and an insulation ring fitted over an outer circumferential surface of the external conductive body and movable between a shielding position, in which the insulation ring covers the first through hole, and a non-shielding position, in which the first through hole is not covered by the insulation ring, in the non-shielding position, a portion of the fastener positioned in the connection hole is exposed from the first through hole and second through hole that are aligned with each other.

2. The cable connector according to claim 1, wherein a wall of the insulation ring has a third through hole, in the shielding position, the third through hole is spaced apart from the first through hole in a circumferential direction so that the insulation ring covers the first through hole, and in the non-shielding position, the third through hole is aligned radially with the first through hole and allows the fastener positioned in the connection hole to be exposed from the first through hole, second through hole, and third through hole which are aligned with one another.

3. The cable connector according to claim 2, wherein the first through hole, second through hole, and third through hole allow an operating tool to extend through the first through hole, second through hole, and third through hole to operate the fastener positioned in the connection hole to fasten the central conductor inserted into the insertion cavity.

4. The cable connector according to claim 1, wherein the insulation ring is slidable or rotatable on the outer circumferential surface of the external conductive body to be shifted to one of the shielding position and the non-shielding position.

5. The cable connector according to claim 4, wherein one of a guide groove and a guide rib is formed on the outer circumferential surface of the external conductive body, and the other of the guide groove and the guide rib is formed on an inner wall surface of the insulation ring, the guide rib being slidable in the guide groove.

6. The cable connector according to claim 1, wherein one of a locking groove and a locking protrusion is formed on the outer circumferential surface of the external conductive body, and the other of the locking groove and the locking protrusion is formed on an inner wall surface of the insulation ring, the locking protrusion is embedded and locked in the locking groove in at least one of the shielding position and the non-shielding position.

7. The cable connector according to claim 1, wherein the insulation ring is a cylindrical body made of an elastic material.

8. The cable connector according to claim 5, wherein the outer circumferential surface of the external conductive body has a step with a pair of adjacent step surfaces and a wall surface located between the step surfaces, one of the step surfaces is formed with the guide groove, and the insulation ring is axially positioned between the wall surface and the guide groove.

9. The cable connector according to claim 1, wherein the fastener has a first end positioned within the second accommodating cavity and an opposite second end positioned within the insertion cavity, the first end is at least partially exposed from the first through hole and the second through hole that are aligned with each other, the second end presses the central conductor in the insertion cavity.

10. The cable connector according to claim 9, wherein an outer diameter of the first end of the fastener is greater than an inner diameter of the second through hole and the first end is stopped by the inner wall of the second accommodating cavity.

11. The cable connector according to claim 9, wherein the fastener includes a screw and the connection hole includes a threaded hole.

12. The cable connector according to claim 10, further comprising a pressing spacer positioned in the insertion cavity, the pressing spacer has a pressing surface pressed against an outer circumferential surface of the central conductor, the pressing spacer is pushed by the fastener to press the central conductor onto an inner wall of the insertion cavity by the pressing surface.

13. The cable connector according to claim 12, wherein the pressing spacer is mounted to the second end of the fastener to move together with the fastener when the fastener is operated to move radially.

14. The cable connector according to claim 13, wherein the pressing spacer has a U-shaped contour and includes a first arm portion and a second arm portion which are opposite to each other, the first arm portion has an installation hole, the second end of the fastener is mounted in the installation hole via an open end of the U-shaped contour, the pressing surface is defined by a flat or curved surface of the second arm portion facing the central conductor.

15. The cable connector according to claim 13, wherein the pressing spacer includes a bottom and a pair of limit portions extending from opposite sides of the bottom towards each other, the pressing surface is defined by a flat or curved surface of the bottom facing the central conductor, and the limiting portions are spaced apart from each other to define an installation hole therebetween, the second end of the fastener is mounted in the installation hole and limited in position by the limit portions to prevent the fastener from radially detaching from the pressing spacer.

16. The cable connector according to claim 15, wherein each limit portion has a C-shaped contour having a first end connected to the bottom and an opposite second end extending towards the other limit portion, and each limit portion has at the second end an extension portion extending towards the other limit portion, a distance between the extension portions of the limit portions is smaller than an outer diameter of the second end of the fastener.

17. The cable connector according to claim 1, wherein the cable has an outer braid layer, the insulation ring is positioned so that the outer braid layer of the cable inserted into the cable connector is placed on an outer circumferential surface of the insulation ring so as to be positioned between the insulation ring and the outer shell, and in the shielding position, the insulation ring electrically isolates the fastener positioned in the connection hole from the outer braid layer.

18. The cable connector according to claim 2, wherein the cable has an outer braid layer, the insulation ring is positioned so that the outer braid layer of the cable inserted into the cable connector is placed on an outer circumferential surface of the insulation ring so as to be positioned between the insulation ring and the outer shell, and in the shielding position, the insulation ring electrically isolates the fastener positioned in the connection hole from the outer braid layer.

19. The cable connector according to claim 12, wherein the cable has an outer braid layer, the insulation ring is positioned so that the outer braid layer of the cable inserted into the cable connector is placed on an outer circumferential surface of the insulation ring so as to be positioned between the insulation ring and the outer shell, and in the shielding position, the insulation ring electrically isolates the fastener positioned in the connection hole from the outer braid layer.

20. The cable connector according to claim 1, wherein the cable connector is a dual port connector with two insertion cavities or a three port connector with three insertion cavities.

* * * * *